United States Patent
Nakagawa et al.

(10) Patent No.: US 7,135,253 B2
(45) Date of Patent: Nov. 14, 2006

(54) HIGH DISCHARGE CURRENT LITHIUM SECONDARY BATTERY AND METHOD OF MANUFACTURE

(75) Inventors: Toshihiko Nakagawa, Chiryu (JP); Kenshin Kitoh, Nagoya (JP); Hiroshi Nemoto, Nagoya (JP); Toshihiro Yoshida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 399 days.

(21) Appl. No.: 10/287,182

(22) Filed: Nov. 4, 2002

(65) Prior Publication Data

US 2003/0087158 A1    May 8, 2003

(30) Foreign Application Priority Data

Nov. 8, 2001   (JP) .............................. 2001-343552
Jan. 23, 2002   (JP) .............................. 2002-014362

(51) Int. Cl.
*H01M 2/14*   (2006.01)
*H01M 2/16*   (2006.01)

(52) U.S. Cl. ..................... 429/255; 429/247; 429/249

(58) Field of Classification Search ................. 429/94, 429/164, 174, 247, 249, 255
See application file for complete search history.

(56) References Cited

U.S. PATENT DOCUMENTS 5,571,632 A * 11/1996 Teramoto ..................... 429/94
5,849,431 A * 12/1998 Kita et al. ................... 429/164
6,074,523 A * 6/2000 Mizobuchi et al. ........... 162/91

FOREIGN PATENT DOCUMENTS

| EP | 0 603 397 | 6/1994 |
| EP | 0 803 342 | 10/1997 |
| EP | 1 063 720 | 12/2000 |
| EP | 1059681 A2 * | 12/2000 |
| JP | 10162801 A * | 6/1998 |
| JP | 2001-006747 | 1/2001 |

* cited by examiner

*Primary Examiner*—Gregg Cantelmo
(74) *Attorney, Agent, or Firm*—Burr & Brown

(57) ABSTRACT

To provide a lithium secondary battery with a high critical discharge current even under a low temperature condition, with an excellent cycle characteristic and reduced manufacturing cost. The lithium secondary battery includes a wound type electrode body comprising a positive electrode plate, and a negative electrode plate both of which have been wound around a core via a separator, the electrode body being impregnated with a non-aqueous electrolyte, and a cylindrical case for housing the electrode body and the non-aqueous electrolyte; the case having at least one opening at either end thereof, which can be sealed. The separator is subjected to drying treatment after the electrode body is inserted into the cylindrical case.

17 Claims, 2 Drawing Sheets

HIGH DISCHARGE CURRENT LITHIUM SECONDARY BATTERY AND METHOD OF MANUFACTURE

BACKGROUND OF THE INVENTION AND RELATED ART STATEMENT

The present invention relates to a lithium secondary battery providing high output even under a low temperature condition, with an excellent cycle characteristic and reduced manufacturing cost.

Lithium secondary batteries are widely used as small and high energy density chargeable/dischargeable secondary batteries providing power supplies for portable communication devices and electronic devices such as notebook personal computers in recent years. Furthermore, with increasing concern about resource saving and energy saving against a background of international protection of the global environment, lithium secondary batteries are also expected as batteries for driving motors of electric vehicles (EV) and hybrid electric vehicles (HEV) for which the automobile industry is studying the development of a positive marketing campaign or as effective means for using electric power by saving nighttime electric power, and there is a strong urge to commercialize large-capacity lithium secondary batteries suitable for these applications.

Lithium secondary batteries generally use lithium transition metal complex oxides as positive active materials and carbonaceous materials such as hard carbon and graphite as negative active materials. Since the reaction potential of a lithium secondary battery is as high as approximately 4.1 V, no conventional water-based electrolyte can be used as its electrolyte, and therefore a non-aqueous electrolyte which is a lithium compound as an electrolyte dissolved into an organic solvent is used instead. A charging reaction takes place when $Li^+$ in the positive active material is transferred through the non-aqueous electrolyte to and captured by the negative active material, and a reverse battery reaction takes place during a discharge.

Among such lithium secondary batteries, a relatively large capacity lithium secondary battery suitable for an EV or HEV, etc. preferably uses as its electrode body a wound type electrode body 1 as shown in FIG. 1 made up of electrode plates (positive electrode plate 2 and negative electrode plate 3) to which current collector tabs (positive current collector tab 5, negative current collector tab 6) functioning as lead wires are attached, wound around a core 7 with a separator 4 inserted in between to prevent the two electrode plates from contacting each other.

The positive electrode plate 2 and the negative electrode plate 3 are layers formed by applying respective electrode active materials (which refer to both positive active material and negative active material) to both surfaces of the current collector substrates such as metal foil. The positive current collector tab 5 and the negative current collector tab 6 can be attached to exposed metal foils at the ends of the positive electrode plate 2 and the negative electrode plate 3 at predetermined intervals using a suitable means such as ultrasonic welding during an operation wherein the positive electrode plate 2, and the negative electrode plate 3 are wound around the core 7, by sandwiching a separator 4.

Batteries used for an EV or HEV or the like may be required not only to have a large capacity but also to produce an instantaneous discharge of high current especially at the time of starting the engine or climbing a slope, etc. That is, the development of batteries having a characteristic of high in critical discharge current is required.

Here, focusing attention on the separator made of a porous film of polyolefin, etc. inserted between the positive and negative electrode plates, the separator does not always have excellent wettability for the non-aqueous electrolyte, that is, affinity or permeability, which is considered to cause not a little influence on characteristics of the battery.

JP-A-2001-6747 discloses a non-aqueous electrolyte secondary battery which uses paper having predetermined physical properties as a separator and improves battery characteristics. Even the non-aqueous electrolyte secondary battery described in the above publication does not provide sufficient performance as a battery for which a discharge of instantaneous high current is required. Furthermore, a battery which is supposed to be installed and used under a low-temperature condition, for example, a vehicle-mounted battery, etc. needs to demonstrate sufficient battery characteristics even under such a condition and therefore there is a demand for further improvements.

SUMMARY OF THE INVENTION

The present invention has been achieved in view of such problems of the conventional arts and it is an object of the present invention to provide a lithium secondary battery with a high critical discharge current even under a low-temperature condition, a satisfactory cycle characteristic and reduced manufacturing cost.

That is, according to the present invention, there is provided a lithium secondary battery includes a wound type electrode body comprising a positive electrode plate, and a negative electrode plate both of which have been wound around a core via a separator; said electrode body being impregnated with a non-aqueous electrolyte, and a cylindrical case for housing the electrode body and the non-aqueous electrolyte; the case having at least one opening at either end thereof; said at least one opening being sealed, wherein the separator is subjected to drying treatment. The separator in the present invention is preferably made of paper.

In the present invention, it is preferable that the paper be substantially made of cellulose, cellulose derivative or a mixture thereof.

In the present invention, the drying treatment is preferably heat treatment and the heat treatment is preferably treatment using high frequency heating or microwave heating and further the dielectric heat treatment is preferably performed by applying high frequency or microwave to the positive electrode plate and negative electrode plate after the wound type electrode body is housed in the battery case, but before the non-aqueous electrolyte is injected.

Furthermore, drying treatment is preferably performed with the wound type electrode body wound and furthermore with the wound type electrode body housed in the battery case.

In the present invention, the inside of the battery case is preferably subjected to decompression processing through the opening the moment the drying treatment is performed and the decompression processing is preferably followed by injection of the non-aqueous electrolyte into the battery case.

The number of openings installed in the battery case for the present invention is preferably one and the core is preferably a hollow-body and the opening is preferably provided at a position corresponding to the center axis of the core.

Furthermore, the opening in the present invention is preferably an inlet of the non-aqueous electrolyte and a sealing member for sealing the opening is preferably provided with a pressure-releasing hole.

The lithium secondary battery according to the present invention is suitable for a large capacity battery having a cell capacity of 2 Ah or more and preferably usable as a power supply for driving the motor of an electric vehicle or hybrid electric vehicle in which a high current frequently discharges.

Figure 1:
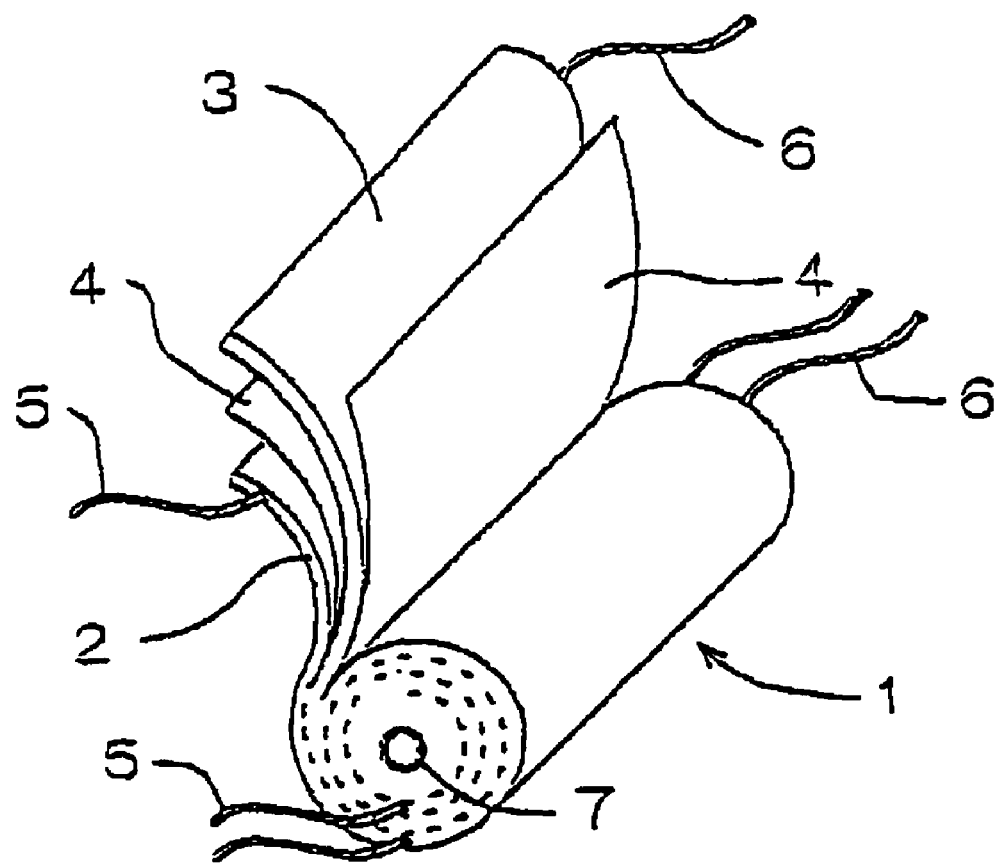
FIG. 1 is a perspective view showing a structure of a wound type electrode body.

In the accompanied drawings, the following numerical symbols denote the following meanings, respectively:
1 Wound type electrode body
2 Positive electrode plate
3 Negative electrode plate
4 Separator
5 Positive electrode current collector tab
6 Negative electrode current collector tab
7 Core
50 Current collector member
61 Wound type electrode body
67 Core
68 Battery
69A Positive electrode inner terminal
69B Negative electrode inner terminal
70A Positive electrode outer terminal
70B Negative electrode outer terminal
71A Positive electrode battery cover
71B Negative electrode battery cover
72 Electrode lead member
73 Battery case
74 Constriction processed section
75 Pressure-releasing hole

DETAILED DESCRIPTION OF PREFERRED EMBODIMENT

An embodiment of the present invention will be explained hereunder. However, the present invention is not limited to the following embodiment in any sense, and it should be understood that any appropriate design modification or any improvement, and the like which can be made based on the knowledge of those skilled in the art without departing from the spirit and/or scope of the present invention is still within the scope of the present invention.

According to the present invention, there is provided a lithium secondary battery comprising a wound type electrode body being composed of a positive plate and a negative plate wound around a core by sandwiched a separator therebetween; said electrode body being housed in a cylindrical battery case having at least one opening at either end thereof, and impregnated with a non-aqueous electrolyte; said al least opening being sealed, wherein the separator is subjected to drying treatment. The present invention will be explained in detail below.

FIG. 1 is a perspective view showing a structure of the wound type electrode body, which comprises a positive electrode plate 2 and a negative electrode plate 3 provided with positive electrode current collector tabs 5, and negative electrode current collector tabs 6 that function as a lead wire, respectively; said two electrode plates having been wound around a core 7 by sandwiching a separator 4 therebetween to prevent the electrode plates from contacting each other. The lithium secondary battery according to the present invention is characterized in that the separator 4 is subjected to drying treatment. The use of the separator subjected to drying treatment prevents movements of lithium ions of the electrolyte from being interfered and prevents polarization. As a result, this embodiment has a feature of demonstrating a good charge/discharge cycle characteristic (which refers to a cell capacity variation characteristic due to repeated charges and discharges and hereinafter referred to as "cycle characteristic").

Examples of the material of the separator 4 include a general porous polymer, for example, a 3-layer structure (hereinafter referred to as "polyolefin 3-layer structure") with $Li^+$ permeable polyethylene film (PE film) sandwiched by porous $Li^+$ permeable polypropylene films (PP films) or paper, etc. In the present invention, the separator is preferably made of paper. Using paper as the separator has an effect of being higher in a critical discharge current than the separator made of general porous polymer.

By the way, since paper is a material having a moisture-absorbing property, if paper is used as the separator, a trace quantity of water content remained therein will cause hydrogen fluoride (HF) to be easily generated in the battery system, which in turn reacts with the positive electrode active material with making Mn leach out, constituting a factor of deterioration of the cycle characteristic. However, the separator of the lithium secondary battery of the present invention is subjected to drying treatment, which minimizes generation of hydrogen fluoride in the battery system, demonstrating the effect of improving the cycle characteristic compared to a lithium secondary battery using a separator without drying treatment.

In addition, paper is a cheap material and the separator made of paper is by far cheaper than a separator having a polyolefin 3-layer structure. Therefore, the lithium secondary battery of the present invention using a separator made of paper not only demonstrates a characteristic of being high in a critical discharge current but also reduces the manufacturing cost.

In the present invention, it is preferable that the paper composing the separator be substantially made of cellulose, cellulose derivative or a mixture thereof. These materials are cheap and easily available and those with micropores in appropriate size have physical properties suitable for the separator for the lithium secondary battery and are preferable in both aspects of a reduction of the manufacturing cost and improvement of battery characteristics.

By the way, in order to improve permeability of lithium ions of the electrolyte, the separator may also be subjected to surface treatment using chemicals such as a surface active agent, depending on the kind of cellulose, or cellulose derivative used as a material therefor. Furthermore, cellulose or cellulose derivative may be subjected to surface treatment for the improvement of the resistance to the electrolyte, too.

Then, the structure of the lithium secondary battery according to the present invention and major components for assembling the battery will be explained by using an example of its manufacturing method. The positive electrode plate is prepared by coating a positive electrode active material to both sides of a current collector substrate. As the current collector substrate, a metal foil such as aluminum foil or titanium foil is used which has good corrosion resistance against electro-chemical reaction at the positive electrode. In addition to the foil, a punched metal or a mesh made of such material may also be used. As the positive electrode active material, lithium transition metal compound oxides such as lithium manganate ($LiMn_2O_4$), lithium cobaltite ($LiCoO_2$) and lithium nickelite ($LiNiO_2$) or the like are preferably used.

It is also preferable to add carbon powder such as acetylene black to the positive electrode active material as a conductive assistant and it can be added arbitrarily within a range of 2 to 10 mass percentage.

In is also preferable to use lithium manganate having a cubic system spinel structure mainly composed of Li and Mn (hereinafter simply referred to as "lithium manganate") as the positive electrode active material because this compound may reduce the resistance of the inner electrode body, when compared with the case where other positive electrode substances are used.

The stoichiometrical composition of lithium manganate is expressed as $LiMn_2O_4$, but the present invention is not limited to such a stoichiometrical composition and $LiM_zMn_{2-z}O_4$ (where M is a substitution element and Z is an amount of substitution) is also suitably usable, which is obtained by substituting part of transition element Mn by two or more elements of at least one type of element selected from a group including Ti and other elements such as Li, Fe, Ni, Mg, Zn, B, Al, Co, Cr, Si, Sn, P, V, Sb, Nb, Ta, Mo and W.

When the above element substitution is performed, the Li/Mn ratio (mol ratio) is $(1+Z)/(2-Z)$ wherein Z denotes the molar ratio of the element(s) used for the substitution if Li which has substituted Mn is excessive and $1/(2-Z)$ if a substitution element M other than Li has substituted Mn, and therefore Li/Mn ratio $>0.5$ always results in all cases.

As shown above, it is preferable for the present invention to use lithium manganate whose Li/Mn ratio exceeds 0.5. This further stabilizes the crystalline structure compared to the case where a stoichiometrical composition is used, making it possible to obtain a battery with an excellent cycle characteristic.

By the way, with regard to the substitution element M, theoretically, Li becomes positive univalent ion, Fe, Mn, Ni, Mg and Zn become positive bivalent ions, B, Al, Co and Cr become positive trivalent ions, Si, Ti and Sn become positive tetravalent ions, P, V, Sb, Nb and Ta become positive pentavalent ions and Mo and W become positive hexavalent ions and these are elements which are intercrystallized into $LiMn_2O_4$, and there are also cases where Co and Sn are positive bivalent ions, Fe, Sb and Ti are positive trivalent ions, Mn is positive trivalent or positive tetravalent ion, Cr is positive tetravalent or hexavalent. Therefore, various substitution elements M can exist with mixed atomic valences and the amount of oxygen need not always be 4 as expressed in the stoichiometrical composition and these may also be missing within a range to maintain the crystalline structure or may also exist excessively.

Application of the positive electrode active material is performed by coating a slurry or paste prepared by adding a solvent or a binder to powder of a positive electrode active material to the current collector substrate using a roll coater method, etc, and drying thus coated material. Then, press work, etc. is applied if necessary.

The negative electrode plate can also be prepared in much the same way as for the positive electrode plate. As the current collector substrate which is a component of the negative electrode plate, a metal foil such as copper foil or nickel foil which has a good corrosion characteristic against electrochemical reaction of the negative electrode is used preferably. As the negative electrode active material, an amorphous type carbonaceous material such as soft carbon or hard carbon or artificial graphite or high graphite content carbon material such as natural graphite is used while fiber is ideally used as the high graphite content carbon material.

As the separator, as already described $Li^+$ permeable porous polymer (polyolefin 3-layer structure) or paper separator is suitably used. In the case of the separator with a polyolefin 3-layer structure, when the temperature of the electrode body rises, the PE film may be softened at approximately 130° C. and micropores may burst, which also serves as a safety mechanism which suppresses movement of $Li^+$, that is, reaction of the battery. Furthermore, by sandwiching this PE film having a lower softening temperature, even if the PE film is softened, it is possible to maintain the shape of the PP film, preventing contract or short-circuit between the positive electrode plate and negative electrode plate. Thus, the cell reaction is effectively suppressed, and the safety of the battery is attained.

Then, the non-aqueous electrode will be explained. As the solvent, a carbonate-based solvent such as ethylene carbonate (EC), diethyl carbonate (DEC), dimethyl carbonate (DMC), propylene carbonate (PC) or a single solvent such as γ-butyrolactone, tetrahydrofuran, acetonitrile or mixed solvent is suitable. In the present invention, from the standpoint of solubility of the lithium compound used for the electrolyte or an operating temperature range of the battery, a mixed solvent of a cyclic carbonate and a chain carbonate mixed at a desired mixing ratio can be used suitably.

Examples of the electrolyte include lithium complex fluorine compound such as lithium hexafluoro phosphate ($LiPF_6$), lithium fluoroborate ($LiBF_4$) or lithium halogen compound such as lithium perchlorate ($LiClO_4$) and one, or two or more types of substances are dissolved into the above described organic solvent (mixed solvent). It is particularly preferable to use $LiPF_6$ which is resistant to oxidation and decomposition and provides high conductivity for the non-aqueous electrolyte.

The separator used for the lithium secondary battery of the present invention is subjected to the aforementioned drying treatment and the drying treatment is preferably heat treatment, which is capable of efficiently removing water inevitably contained in a material for separator. It is preferred that the water content of the material for separator after drying treatment is within a range of 0.0001 ppm or less.

When the electrode plates and separator are wound together, current collector tabs are attached to the exposed parts free of electrode active materials of the respective electrode plates. As the current collector tabs, foil-like tabs made of the same material as that of the current collector substrates of the respective electrode plates is used suitably. The current collector tabs can be attached to the electrode plates using ultrasonic welding or spot welding, etc.

The heat treatment for drying the separator in the present invention is preferably dielectric heat treatment and more specifically, this dielectric heat treatment is preferably treatment using high frequency heating or microwave heating. Furthermore, the dielectric heat treatment is preferably performed by applying a high frequency or microwave to the positive electrode plate and negative electrode plate after the wound type electrode body is housed in the battery case and before the non-aqueous electrolyte is injected. The positive electrode plate and negative electrode plate of the wound type electrode body before the non-aqueous electrolyte is injected can be considered to form a capacitor with the separator placed in between. If a high frequency or microwave is applied to the positive electrode plate and negative electrode plate in this condition, only the separator is heated due to the dielectric constant and dielectric loss of the capacitor with the separator. That is, it is possible to efficiently use energy for heating of the separator to be dried compared to the drying treatment, etc. using an external heat source such as a heater.

While securing conduction between the terminals to pick up the current to the outside and the current collector tabs, the wound type electrode body prepared is housed in the battery case and held in a stable place. Here, the separator drying treatment is preferably performed with the wound type electrode body wound and with the wound type electrode body housed in the battery case. The separator drying treatment can be performed in a stage prior to winding, but there is a possibility that water will be absorbed again in a stage of subsequent winding operation, etc. To avoid such a situation, it is necessary to keep dry the whole battery assembly process after the drying treatment, but such an operation may be complicated. Therefore, if the wound type electrode body is prepared using the separator beforehand and drying treatment is applied with the wound type electrode body wound and with the wound type electrode body housed in the battery case, there will be no need to keep dry the whole battery assembly process, which will simplify the operation and reduce the manufacturing cost.

If the wound type electrode body creation process, that is, the separator drying process and non-aqueous electrolyte impregnation process are executed as processes independent of one another, the following battery assembly process can be assumed. That is, the assembly is completed by undergoing processes like (1) heating while performing decompression processing through the opening, (2) substitution of the inside of the battery case by dry air or nitrogen, etc., (3) injection of the non-aqueous electrolyte after sealing the opening with a temporary cover, etc., (4) second decompression processing, (5) impregnation of non-aqueous electrolyte in a vacuum, (6) sealing of the opening. It is preferable here in the present invention that the drying treatment be performed together with the decompression processing of the inside of the battery case through the opening because in this way the separator can be dried effectively and the decompression processing for subsequent impregnation with the non-aqueous electrolyte is performed at the same time. That is, since processes (2) to (4) of the above processes (1) to (6) are omitted, and therefore the battery assembly operation will be simplified and the manufacturing cost can thereby be reduced. This also has the effect of the possibility of simplifying the battery structure.

The number of openings is preferably one in the present invention, because in this way the inside of the battery case can be fully decompressed and the structure of the battery, especially the structure of the part where the opening is provided (electrode cover, etc.) becomes simple.

Here, the opening in the present invention is preferably the inlet of the non-aqueous electrolyte, which makes it possible to dry paper with the inside of the battery case kept decompressed and impregnate the inside of the decompressed battery case with the non-aqueous electrolyte through the same opening.

Figure 2:
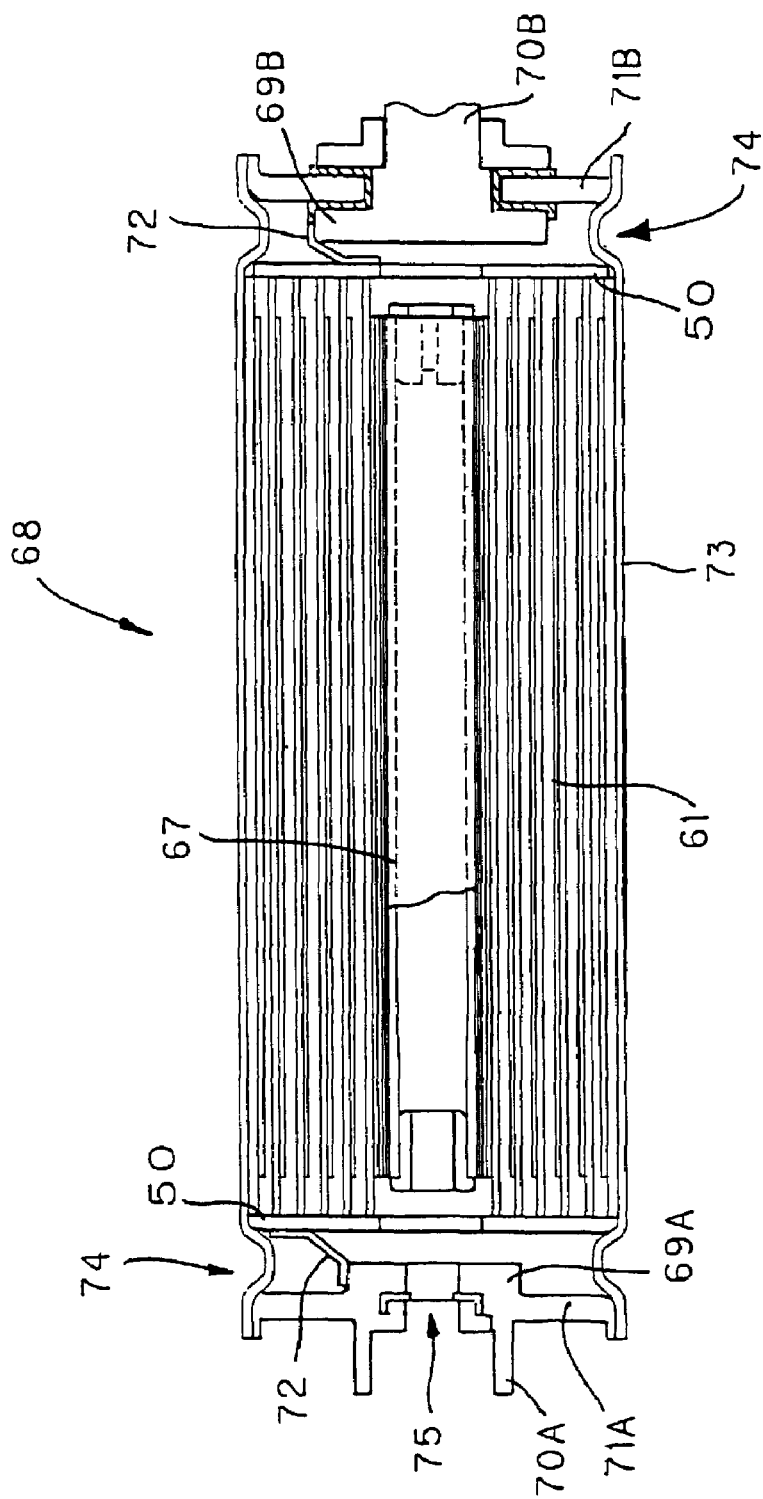
FIG. 2 is a cross-sectional view of an embodiment of a lithium secondary battery of the present invention.

FIG. 2 is a cross-sectional view showing an embodiment of the lithium secondary battery of the present invention. A wound type electrode body 61 is housed inside a cylindrical battery case 73, a current collector member 50 for leading out a current is attached to both ends of this wound type electrode body 61 and external terminals (positive electrode external terminal 70A, negative electrode external terminal 70B) are connected via electrode lead members 72. In the present invention, it is preferable that a core 67 which is a component of the wound type electrode body 61 be hollow and an opening be provided at a position corresponding to the center axis of the core 67 and furthermore, a blocking member for blocking the opening be provided with a pressure-releasing hole 75. Such a structure causes the pressure-releasing hole 75 to be placed in an extension of the center axis of the core 67 and even if an inner pressure increases, it is possible to decompress very speedily and uniformly, and therefore it is also preferable from the standpoint of not only the manufacturing cost but also securing safety.

Furthermore, the positive electrode current collector tab 5 and negative electrode current collector tab 6 in the wound type electrode body 1 as shown in FIG. 1 are not essential members, but these can also have a structure as shown in FIG. 2 in which the positive and negative electrode plates making up the wound type electrode body 61 are directly connected to the collector member 50 and they can further have a structure in which the collector member 50 and internal terminals 69A and 69B are directly connected without the electrode lead member 72 inserted in between.

As shown above, the lithium secondary battery and its embodiments have been explained, but it goes without saying that the present invention is not limited to the above described embodiments. Furthermore, the lithium secondary battery according to the present invention is ideally applicable to a large battery with a cell capacity of 2 Ah or above, but this does not constitute any impediment to its application to a battery having a smaller capacity. Furthermore, the lithium secondary battery of the present invention is ideally applicable to a vehicle-mounted battery taking advantage of the large capacity, low cost and high reliability or is preferably applicable to a motor drive power supply for an electric vehicle or hybrid electric vehicle and is suitably used to start an engine requiring a high voltage.

Embodiments

Hereunder, the present invention will be explained more specifically by using embodiments, but the present invention is not limited to these embodiments.

(Manufacturing of Wound Type Electrode Body)

$LiMn_2O_4$ spinel is used as a positive electrode active material, acetylene black of 4 mass % is added thereto as a conductive assistant and a solvent and binder are further added thereto to prepare positive electrode slurry. This positive electrode slurry is applied to both sides of an aluminum foil of 20 μm in thickness so as to form a film of approximately 100 μm in thickness to prepare a positive electrode plate, while graphite powder is used as a negative electrode active material and applied to both sides of a copper foil of 10 μm in thickness so as to form a film of approximately 80 μm in thickness to prepare a negative electrode plate.

Then, a separator made of 30-μm thick paper and a separator with a 30-μm thick polyolefin 3-layer structure (polypropylene (PP)/polyethylene (PE)/polypropylene (PP)) and an aluminum hollow core are prepared, the positive electrode plate and negative electrode plate are wound around the core with inserting the separator therebetween to create a wound type electrode body. Then, this wound type electrode body is housed in a battery case, subjected to vacuum deaeration at 100° C. under a pressure of 1 Pa for 24 hours and then subjected to full drying treatment (Embodiments 1 and 2).

Furthermore, the same separator made of 30-μm thick paper and separator with a 30-μm thick polyolefin 3-layer structure (polypropylene (PP)/polyethylene (PE)/polypropylene (PP)) as those in Embodiments 1 and 2 except that no drying treatment is performed are used to create a wound type electrode body, which is then housed in the battery case (Comparative examples 1 and 2).

(Preparation of Non-Aqueous Electrolyte)

Organic solvents such as EC, DMC and EMC are mixed at a volume ratio of 1:1:1 to prepare a mixed solvent, electrolyte $LiPF_6$ is dissolved into this to reach a concentration of 1 mol/l, thus preparing a non-aqueous electrolyte.

(Preparation of Battery)

The battery case housing the wound type electrode body is filled with the non-aqueous electrolyte and the battery case is sealed to prepare an battery (Embodiments 1 and 2, Comparative examples 1 and 2). All batteries are manufactured by using a dry process. Furthermore, influences of water infiltration from outside the battery due to sealing defects, etc. of the battery are also excluded. The cell capacity after the initial charging of all batteries produced is approximately 8 Ah.

(Measurement of Critical Discharge Current)

After full charging of each battery, the discharge current was increased gradually and the battery was measured with a current equivalent to 1 C (discharge rate) and the maximum current value which corresponds to 80% or more of the discharge capacity is set as a critical discharge current. The result is shown in Table 1.

(Pulse Cycle Test)

A pulse cycle test was conducted for the lithium secondary batteries of above described Embodiments 1 and 2 and Comparative examples 1 and 2. One cycle was set to a pattern consisting of discharging a battery with depth of discharge of 50% at a current of 200 A corresponding to 20 C (discharge rate) for 3 seconds, then making a pause of 3 seconds, then charging at 200 A for 3 seconds and returning it to a 50% charged state. Furthermore, to know a change in the cell capacity, the capacity was measured with a charging stop voltage of 4.1 V and discharging stop voltage of 2.5 V with current strength of 1 C, the cell capacity after 20000 cycles was divided by the initial cell capacity and expressed in percentage to obtain a relative discharge capacity (%). Table 1 shows the results.

TABLE 1

| | Separator | Drying treatment | Critical discharge current (A, −25° C.) | Relative discharge capacity (%, after 20000 cycles) |
|---|---|---|---|---|
| Embodiment 1 | Paper | Yes | 300 | 85 |
| Embodiment 2 | PP/PE/PP 3 layers | Yes | 100 | 87 |
| Comparative example 1 | Paper | No | 300 | 30 |
| Comparative example 2 | PP/PE/PP 3 layers | No | 100 | 65 |

(Discussion)

As shown in Table 1, it has been discovered that the lithium secondary batteries according to Embodiments 1 and 2 still maintain high relative discharge capacity of 85% or above even after 20000 pulse cycle tests compared to the lithium secondary batteries in Comparative examples 1 and 2. Furthermore, it has also been discovered that the lithium secondary battery according to Embodiment 1 using a paper separator has not only a high relative discharge capacity but also a higher critical discharge current at −25° C. than when a separator of a polyolefin 3-layer structure is used. Thus, advantages of the present invention could be confirmed.

As described above, the lithium secondary battery of the present invention applies drying treatment to the separator, which is used as one of composition materials, and therefore it has a good cycle characteristic. It also has a high critical discharge current even under a low temperature condition and moreover the separator drying treatment is performed during the battery manufacturing process, and therefore it has excellent manufacturing efficiency and reduces the manufacturing cost.

What is claimed is:

1. A lithium secondary battery comprising:
   a wound type electrode body comprising a positive electrode plate and a negative electrode plate, both of which have been wound around a core via a separator, said electrode body being impregnated with a non-aqueous electrolyte; and
   a cylindrical case for housing the electrode body and the non-aqueous electrolyte, the case having at least one opening at either end thereof, said at least one opening being sealed,
   wherein said separator is subjected to a drying treatment after the electrode body is inserted into said cylindrical case, and
   wherein said battery exhibits a relative discharge capacity of at least 85% after 20,000 cycles.

2. The lithium secondary battery according to claim 1, wherein said separator is made of paper.

3. The lithium secondary battery according to claim 2, wherein said separator comprises cellulose.

4. The lithium secondary battery according to claim 1, wherein said drying treatment is heat treatment.

5. The lithium secondary battery according to claim 4, wherein said heat treatment is dielectric heat treatment.

6. The lithium secondary battery according to claim 5, wherein said dielectric heat treatment is high frequency heat treatment or microwave heat treatment.

7. The lithium secondary battery according to claim 6, wherein said dielectric heat treatment is performed by applying high frequency or microwave to said positive electrode plate or negative electrode plate after said wound type electrode body is housed in said battery case and before said non-aqueous electrolyte is injected.

8. The lithium secondary battery according to claim 1, wherein said drying treatment is performed with said wound type electrode body wound.

9. The lithium secondary battery according to claim 1, wherein said drying treatment is performed with said wound type electrode body housed in said battery case.

10. The lithium secondary battery according to claim 9, wherein an inside of said battery case is subjected to decompression processing through said opening the moment said drying treatment is performed.

11. The lithium secondary battery according to claim 10, wherein said decompression processing is followed by injection of said non-aqueous electrolyte into said battery case.

12. The lithium secondary battery according to claim 1, wherein the number of said at least one opening is one.

13. The lithium secondary battery according to claim 1, wherein said core is a hollow-body and said at least one opening is provided at a position corresponding to a center axis of said core.

14. The lithium secondary battery according to claim 1, wherein said at least one opening is sized to act as an inlet for said non-aqueous electrolyte.

15. The lithium secondary battery according to claim 1, wherein said at least one opening is sealed with a sealing member being provided with a pressure-releasing hole.

16. The lithium secondary battery according to claim 1, whose battery capacity is 2 Ah or more.

17. The lithium secondary battery according to claim 1, which is a vehicle-mounted battery, wherein the critical discharge current is at least 100A at −25° C.

* * * * *